(12) United States Patent
Heo et al.

(10) Patent No.: US 7,460,766 B2
(45) Date of Patent: Dec. 2, 2008

(54) RECORDING MEDIUM HAVING RECORDED THEREON A DATA STRUCTURE CAPABLE OF LINKING AND REPRODUCING AUDIO DATA AND VIDEO DATA, AND METHOD AND APPARATUS OF RECORDING/REPRODUCING USING THE DATA STRUCTURE

(75) Inventors: Jung-kwon Heo, Seoul (KR); Seong-jin Moon, Suwon (KR); Bong-gil Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1069 days.

(21) Appl. No.: 09/749,586

(22) Filed: Dec. 28, 2000

(65) Prior Publication Data

US 2001/0016112 A1 Aug. 23, 2001

(30) Foreign Application Priority Data

Dec. 31, 1999 (KR) ................................ 1999-67802

(51) Int. Cl.
*H04N 5/91* (2006.01)
*H04N 5/00* (2006.01)
*G11B 5/58* (2006.01)

(52) U.S. Cl. .............................. 386/95; 386/1; 386/46; 386/96; 369/53.2; 348/14.1; 700/83

(58) Field of Classification Search .................. 386/95, 386/125, 1, 46, 126, 96, 83; 369/48, 275.3, 369/47, 54, 58; 358/342; 434/118
See application file for complete search history.

(56) References Cited

U.S. PATENT DOCUMENTS 5,512,938 A * 4/1996 Ohno ........................ 348/14.1

(Continued)

FOREIGN PATENT DOCUMENTS

EP 0 965 991 A1 12/1999

(Continued)

OTHER PUBLICATIONS

Office Action issued in Korean Patent Application No. 1999-67802 on Feb. 3, 2006.

*Primary Examiner*—John W. Miller
*Assistant Examiner*—Jamie J Vent
(74) *Attorney, Agent, or Firm*—Stein, McEwen & Bui, LLP

(57) ABSTRACT

A recording medium recorded by a data structure adapted to link and reproduce audio data and video data, a method of recording/reproducing using the data structure and an apparatus for recording/reproducing using the data structure. On the recording medium, first data and second data, which are different from each other in type and formed of a plurality of data units, are recorded. A first data unit descriptor table and a second data unit descriptor table, in which information on the first data units and the second data units are respectively recorded as data unit descriptors, are recorded. A first program descriptor table and a second program descriptor table, in which information on one or more data units forming respective programs is stored in the program descriptor of the corresponding program in the form of information on respective data unit descriptors, are recorded. Thus, information on the first data units which are to be reproduced after being linked to the second data units is included in the program descriptor of the second program descriptor table. By doing so, using independent data structures for respective independent applications, generation of a new application linking two independent data structures is enabled.

39 Claims, 9 Drawing Sheets

U.S. PATENT DOCUMENTS

| | | | | |
|---|---|---|---|---|
| 5,570,340 A | * | 10/1996 | Lee et al. | 369/47.31 |
| 5,683,253 A | | 11/1997 | Park et al. | |
| 5,903,454 A | * | 5/1999 | Hoffberg et al. | 700/83 |
| 6,215,746 B1 | * | 4/2001 | Ando et al. | 369/53.2 |
| 6,532,335 B2 | * | 3/2003 | Otomo et al. | 386/95 |
| 6,572,381 B1 | * | 6/2003 | Tsai | 434/307 A |

FOREIGN PATENT DOCUMENTS

| | | |
|---|---|---|
| JP | 11120747 | 4/1999 |
| JP | 11120749 | 4/1999 |
| JP | 11-164243 | 6/1999 |
| JP | 11-164246 | 6/1999 |
| JP | 11-191282 | 7/1999 |

* cited by examiner

RECORDING MEDIUM HAVING RECORDED THEREON A DATA STRUCTURE CAPABLE OF LINKING AND REPRODUCING AUDIO DATA AND VIDEO DATA, AND METHOD AND APPARATUS OF RECORDING/REPRODUCING USING THE DATA STRUCTURE

CROSS-REFERENCE TO RELATED APPLICATIONS

This application claims the benefit of Korean Application No. 99-67802 filed Dec. 31, 1999 in the Korean Patent Office, the disclosure of which is incorporated herein by reference.

BACKGROUND OF THE INVENTION

1. Field of the Invention

The present invention relates to audio/video (A/V) data recording/reproducing, and more particularly, to a single recording medium on which is recorded a data structure which is capable of linking and reproducing audio data and video data after the video data and audio data have been recorded on the medium, and to a method and apparatus for recording/reproducing using the data structure.

2. Description of the Related Art

In the existing data structures for recording, as shown in FIG. 1, the video data structure and the audio data structure are independent each other. That is, the structure of data and information for a video program is made of video data 11, a video data descriptor table 12, and a video program descriptor table 13, and likewise, the structure of data and information for an audio program is made of audio data 21, an audio data descriptor table 22, and an audio program descriptor table 23.

Since audio data and video data are recorded/reproduced separately as shown in FIG. 1, separate recording/reproducing apparatuses exist for each type of data. Each recording/reproducing apparatus separately generates and records information (a data descriptor table, and a program descriptor table) on data the apparatus records.

In the linkage relation between video data and information data shown in FIG. 1, video data 11 is made of a plurality of video data units as shown in FIG. 2. A video data unit descriptor for each video data unit is recorded in the video data descriptor table 12. When programs are made of one or more video data units, such information is recorded in each program in the video program descriptor table 13, and information on one or more video data units forming each program is recorded in the program descriptor of the corresponding program in the form of information on a video data unit descriptor. Program descriptors are recorded in a video program descriptor table 13.

FIG. 3 shows the linkage relation between audio data and information data shown in FIG. 1, and illustrates the data structure for recording/reproducing audio data, which is separate from the data structure for recording/reproducing video data shown in FIG. 2.

Like the structure of video data and information data, audio data 21 is made of a plurality of audio data units. An audio data unit descriptor having information on each audio data unit is recorded in an audio data descriptor table 22. When programs are made of one or more audio data units, information on one or more data units forming each program is recorded in the program descriptor of the corresponding program in the form of information on an audio data unit descriptor. That is, audio program descriptors are recorded in an audio program descriptor table 23.

In existing recording structures, on one recording medium, the structure of which data and information for a video program is contained, and a separate video recording/reproducing apparatus performing recording and/or reproducing of the video program using the information structure exists. At the same time, independently of this structure, the structure of data and information for an audio program is recorded on the recording medium, and a separate audio recording/reproducing apparatus performing recording and/or reproducing of the audio program using the information structure exists. These two structures are independent of each other, and each recording/reproducing apparatus performs recording/reproducing operations independently, without considering the other's data and information structure.

A recording/reproducing apparatus using such a data and information structure can record/reproduce both video data and audio data, but cannot perform an operation in which two types of data are linked and then reproduced. For example, the apparatus cannot perform a so-called slide show operation, in which a song recorded in audio data is reproduced and at the same time, a plurality of still pictures recorded in video data are reproduced. This has been a problem.

SUMMARY OF THE INVENTION

To solve the above problems, it is an object of the present invention to provide a recording medium on which is recorded a data structure having a new application which links two independent data structures using an independent data structure for an independent application.

It is another object to provide a recording medium on which is recorded a data structure capable of linking and reproducing audio data and related video data when audio data is reproduced.

It is another object to provide a method of generating a new application which links two independent data structures, using an independent data structure for an independent application.

It is another object to provide a method of generating and recording new information linking two types of data, audio data and video data, using information on each of the two types of data.

It is another object to provide a method of updating new information linking two types of data, audio and video data, in order to always show the latest information on recorded audio and video data.

It is another object to provide a method of simultaneously reproducing audio data and video data, using new information linking the two types of data.

It is another object to provide an apparatus for recording new information so that two types of data are linked and reproduced in an audio/video player after recording video data with a video recorder and recording audio data with an audio recorder.

It is another object to provide an apparatus for simultaneously reproducing two types of data, using new information linking the two types of data on a recording medium on which video data and audio data are recorded.

It is another object to provide a recording/reproducing apparatus for simultaneously reproducing two types of data, using new information in reproducing, after recording new information in an audio/video player so that the two types of data can be linked and reproduced, after video data is recorded using a video recorder and audio data is recorded using an audio recorder when data is recorded.

Additional objects and advantages of the invention will be set forth in part in the description which follows, and, in part, will be obvious from the description, or may be learned by practice of the invention.

To accomplish the above and other objects of the present invention, there is provided a method comprising: recording first data and second data, which are different from each other in type and formed of a plurality of data units, on a recording medium; recording a first data unit descriptor table and a second data unit descriptor table in which information on the first data units and the second data units is stored as first and second data unit descriptors, respectively; and recording a first program descriptor table and a second program descriptor table, in which information on one or more data units forming respective programs are stored as the program descriptor of the corresponding program in the form of information on respective data unit descriptors, on the recording medium, and in which information on one or more of the plurality of first data units, which is to be to reproduced after the first data unit is linked to one or more of the plurality of second data units, is included in the program descriptor of the second program descriptor table.

It is preferable that the method further comprises determining whether information on a first data unit in the second program descriptor table is the same as information on the first data unit in the first data unit descriptor table; and when the information on the two is not the same, updating information on the first data unit in the second program descriptor table so that it becomes the same as information on the first data unit in the first data unit descriptor, and recording the updated information.

To accomplish the above and other objects of the present invention, there is also provided a method of reproducing data from a recording medium on which first data and second data, which are different from each other in type and which are each formed of a respective plurality of data units, are recorded. A first data unit descriptor table and a second data unit descriptor table are also recorded on the recording medium. The first data unit descriptor table and the second data unit descriptor table include information on the first data units and the second data units which is respectively stored as data unit descriptors. A first program descriptor table and a second program descriptor table, in which information on one or more data units forming respective programs is stored in the program descriptor of the corresponding program in the form of information on respective data unit descriptors, are recorded on the recording medium. The program descriptor of the second program descriptor table includes information for linking the first data and the second data. The reproducing method comprises reading the second program descriptor having information on the program to be reproduced, and reading information about the first data unit descriptor and the second data unit descriptor related to the corresponding program, from the read second program descriptor; reading the corresponding data unit descriptors from the first and second data descriptor tables corresponding to the read first and second data unit descriptors; and synchronizing and reproducing the first data unit and the second data unit indicated by the read first and second data unit descriptors.

It is preferable that the method further comprises determining whether or not information on the first data unit in the second program descriptor table is the same as information on the first data unit in the first data unit descriptor; and when the information in the second program descriptor table is not the same as the information in the first data unit descriptor, updating the information on the first data unit in the second program descriptor table so that it becomes the same as information on the first data unit in the first data unit descriptor, and recording the updated information.

To accomplish the above and other objects of the present invention, there is provided an apparatus for recording data of different types on a recording medium, the recording apparatus comprising a first signal processor which formats a first data stream input into independent units, codes the formatted first data units, and provides the formatted first data units to the recording medium; a second signal processor which formats a second data stream input into independent units, codes the formatted second data units, and provides the formatted second data units to the recording medium; and a system controller which generates a first data unit descriptor table and a second data unit descriptor table in which information on the first data units and the second data units are respectively stored as data unit descriptors; and a first program descriptor table and a second program descriptor table in which information on one or more data units forming respective programs are stored in the program descriptor of the corresponding program in the form of information on respective data unit descriptors, in which information on the first data unit, which is to be reproduced after being linked to the second data unit, is included in the program descriptor of the second program descriptor table.

To accomplish the above and other objects of the present invention, there is provided an apparatus for reproducing data from a recording medium on which first data and second data, which are different from each other in type and each formed of a respective plurality of data units, are recorded. A first data unit descriptor table and a second data unit descriptor table, which include data unit descriptors having information on respective data units, are recorded;

and a first program descriptor table and a second program descriptor table in which information on one or more data units forming respective programs are stored in the program descriptor of the corresponding program in the form of information on respective data unit descriptors, are recorded, in which information for linking the first data and the second data is recorded in the program descriptor of the second program. A system controller reads the second program descriptor having information on the program to be reproduced, reads information on the first data unit descriptor and the second data unit descriptor related to the corresponding program from the read second program descriptor, and reads corresponding data unit descriptors from the first data descriptor table and the second data descriptor table corresponding respectively to read information on the first data unit descriptor and the second data unit descriptor. A first signal processor has an embedded memory which temporarily stores the corresponding first data unit indicated by the read first data unit descriptor to the memory. The first signal processor decodes the first data unit stored in the memory, and reproduces the decoded first data after adjusting its timing to that of the second data unit. A second signal processor decodes the corresponding second data unit indicated by the read second data unit descriptor and reproduces the decoded second data.

To accomplish the above and other objects of the present invention, there is also provided a recording/reproducing apparatus comprising first and second signal processors. The first signal processor formats a first data input into independent units and codes the formatted first data units during recording and temporarily stores the corresponding data unit indicated by the coded first data unit descriptor to an embedded memory; decodes the first data unit read from the memory; and, during reproduction, reproduces the decoded first data after adjusting the first data timing to that of a second data unit. The second signal processor formats a second data input into independent units and codes the formatted second data units during recording; and, during reproduction, the second signal processor decodes the corresponding second data unit indicated by the read second data unit descriptor and reproduces the decoded second data. A system controller generates a first data unit descriptor table and a second data unit descriptor table which stores information on the first data units and the second data units as data unit descriptors. During recording, the system controller records a first program descriptor table and a second program descriptor table in which information on one or more data units forming respective programs is stored in the program descriptor of the corresponding program in the form of information on respective data unit descriptors in which information on the first data unit to be reproduced after being linked to the second data unit is included in the program descriptor of the second program descriptor table; and, during reproduction, the system controller reads the second program descriptor having information on the program to be reproduced, reads information on the first data unit descriptor and the second data unit descriptor related to the corresponding program from the read second program descriptor, and reads corresponding data stream unit descriptors from the first data descriptor table and the second data descriptor table corresponding respectively to read information on the first data unit descriptor and the second data unit descriptor.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
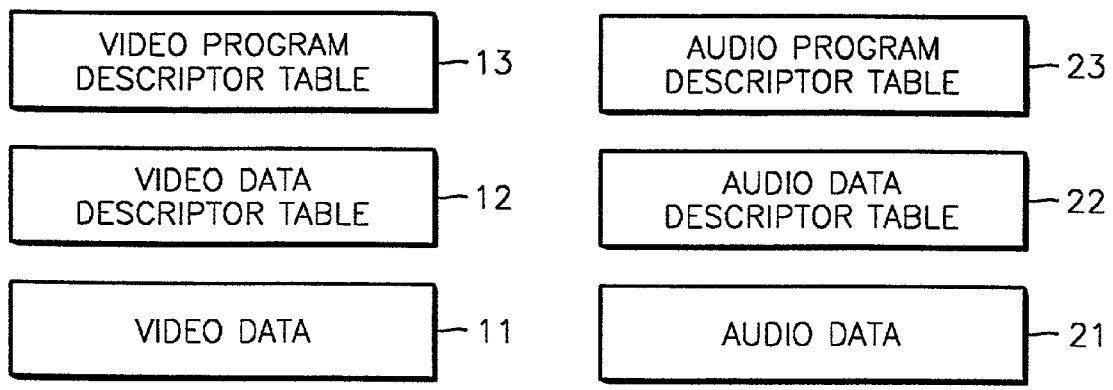
FIG. 1 illustrates the existing structure of video/audio (A/V) data.

Reference will now be made in detail to the present embodiments of the present invention, examples of which are illustrated in the accompanying drawings, wherein like reference numerals refer to like elements throughout. The embodiments of the present invention are provided in order to more completely explain the present invention to anyone skilled in the art.

Figure 4:
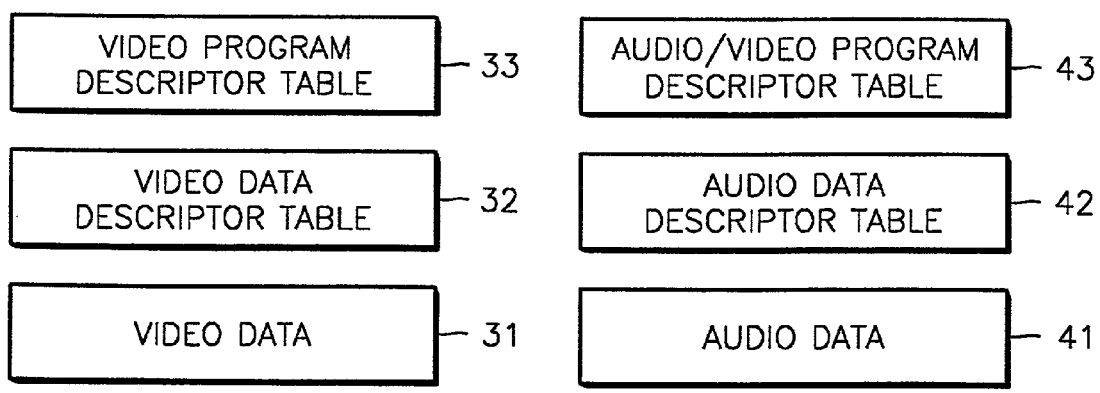
FIG. 4 illustrates an example of a data structure capable of linking and then reproducing audio data and video data according to the present invention.

FIG. 4 illustrates an example of a data structure capable of linking and reproducing audio and video data according to the present invention. Referring to FIG. 4, the data structure for a video application according to the present invention is made of video data 31 formed by one or more video data units, a video data descriptor table 32 having video data descriptors, each of which is the descriptor for a corresponding video data unit, and a video program descriptor table 33 having video program descriptors that are generated when a video program is formed using one or more video data units.

Also, the data structure for an audio application according to the present invention is made of audio data 41 formed by one or more audio data units, an audio data descriptor table 42 having audio data unit descriptors, each of which is the descriptor for a corresponding audio data unit, and an audio/video program descriptor table 43 (hereinafter, referred to as an A/V program descriptor table) having audio/video program descriptors (hereinafter, referred to as A/V program descriptors) each of which is the descriptor for a corresponding program generated by using one or more audio data units and has information on the video program linked to a corresponding program.

Figure 2:
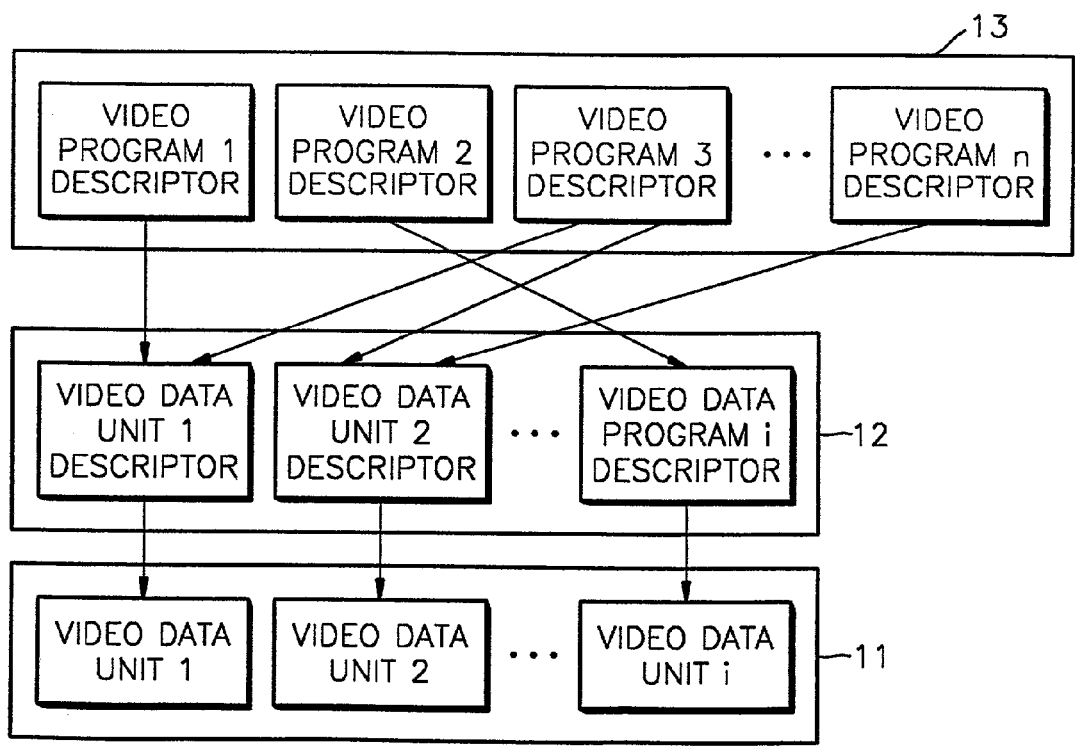
FIG. 2 illustrates the linkage relation between video tables and video data shown in FIG. 1.
Figure 5:
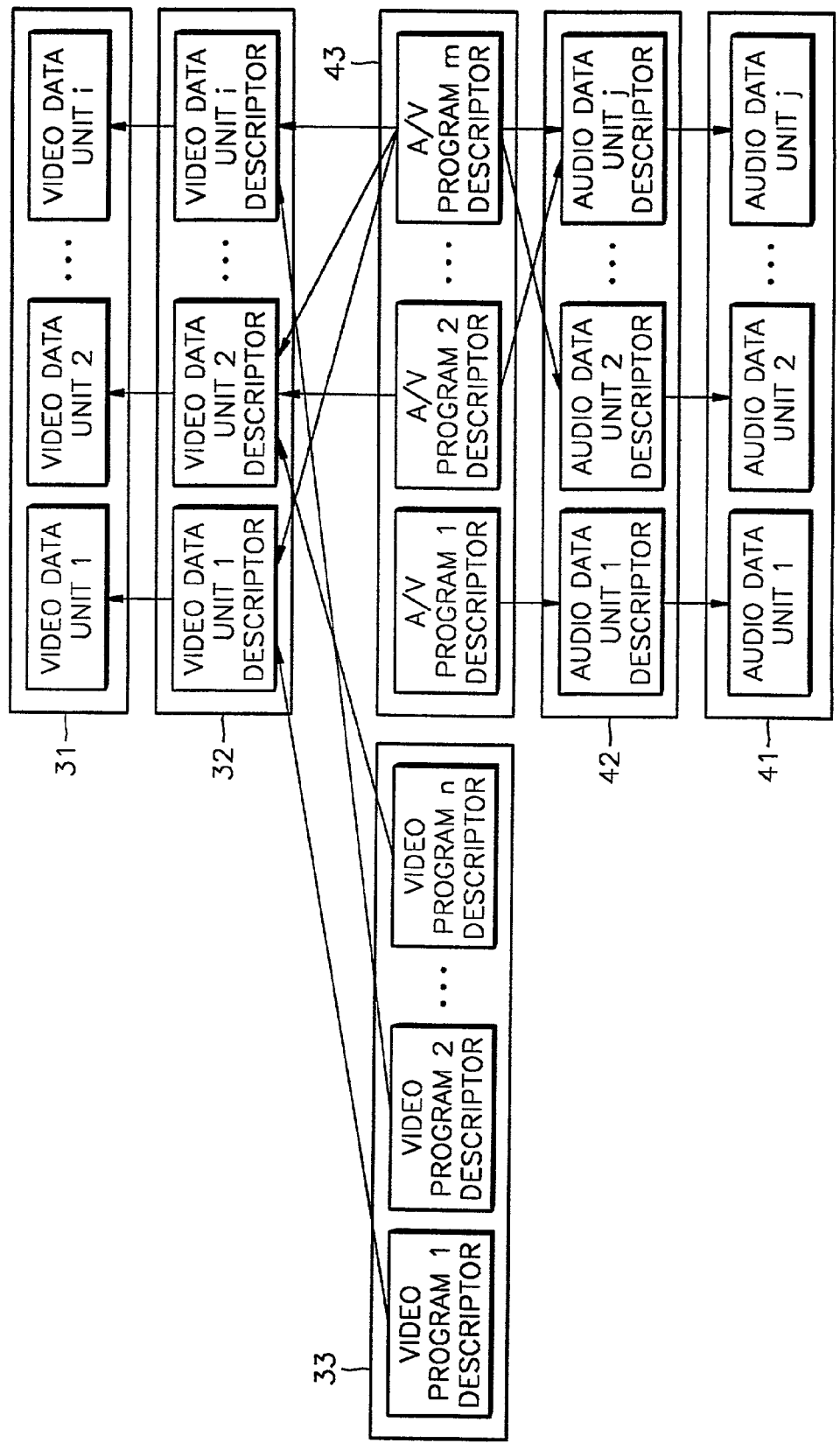
FIG. 5 illustrates the linkage relation between tables and data shown in FIG. 1.

FIG. 5 illustrates the linkage relation between video and/or audio data and information shown in FIG. 4. The linkage relation between video tables and video data shows that video data 31 is formed by a plurality of video data units, the same as in the existing structure shown in FIG. 2. A video data unit descriptor for each video data unit is recorded in a video data descriptor table 32. When a program is formed by one or more video data units, each program records that information in a video program descriptor table 33. Information on one or more video data units forming each program is recorded in a corresponding video program descriptor in the form of information on a video data unit descriptor. Video program descriptors are recorded in the video program descriptor table 33.

Figure 3:
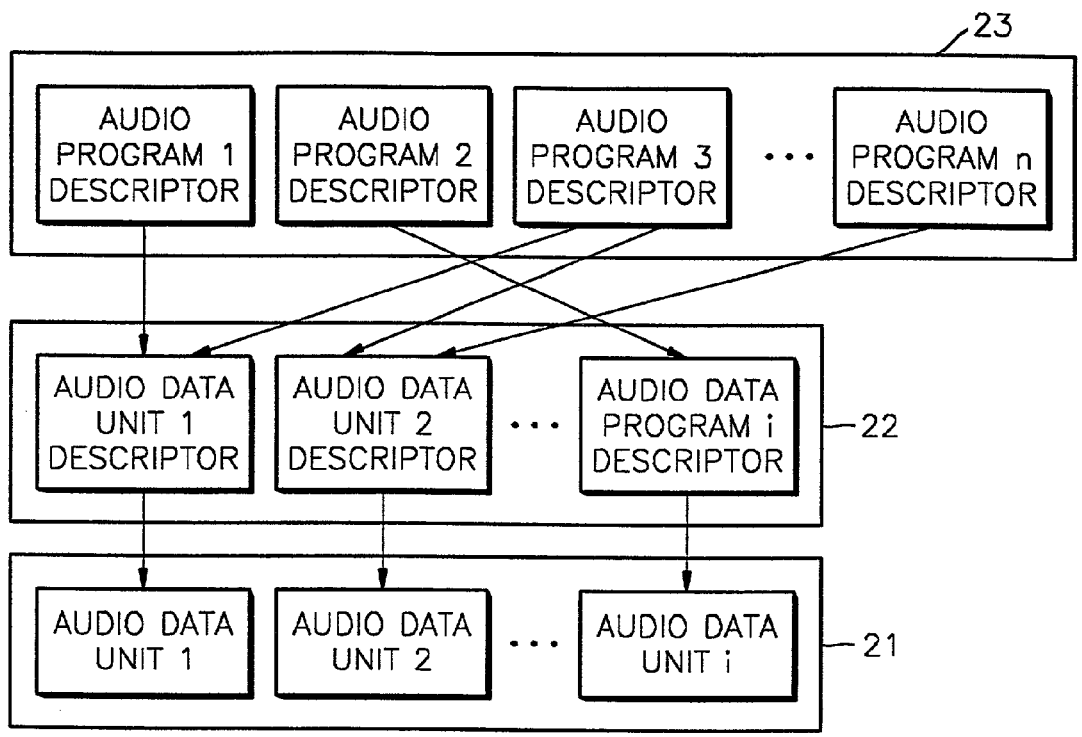
FIG. 3 illustrates the linkage relation between audio tables and audio data shown in FIG. 1.

Meanwhile, audio data 41 is formed by a plurality of audio data units. An audio data unit descriptor for each audio data unit is recorded in an audio data descriptor table 42. When a program is formed by one or more audio data units, such information is recorded in each program in the A/V program descriptor table 43, and information on one or more audio data units forming each program is recorded in the A/V program descriptor of the corresponding program in the form of information on an audio data unit descriptor. A/V program descriptors are recorded in an A/V program descriptor table 43. This method is similar to the method, shown in FIG. 3, which is used when a program exclusively for audio data is generated and recorded.

However, when an A/V program made by the method is to be linked to video data units and then reproduced together, information on the corresponding video data unit, as shown in FIG. 5, that is, information on the video data unit descriptor, is recorded in the A/V program descriptor of a corresponding A/V program.

The A/V program descriptor can be an audio-dedicated program descriptor formed by audio data descriptors, and in this case, information on the linked video data descriptor is not recorded in the corresponding A/V program descriptor. The A/V program descriptor can be formed by one audio data descriptor and one or more video data descriptors, or by one or more audio data descriptors and one or more video data descriptors.

When the data structure shown in FIG. 5 is used, information on video data unit descriptors recorded in the A/V program descriptor table 43 must show actual video data unit descriptors. In order to do so, predetermined information in a video data descriptor table is copied and recorded in the A/V program descriptor table 43. Information that can be used to distinguish a video data unit from other video data units, for example, information on time when the corresponding video data unit is recorded, can be the predetermined information.

Figure 6:
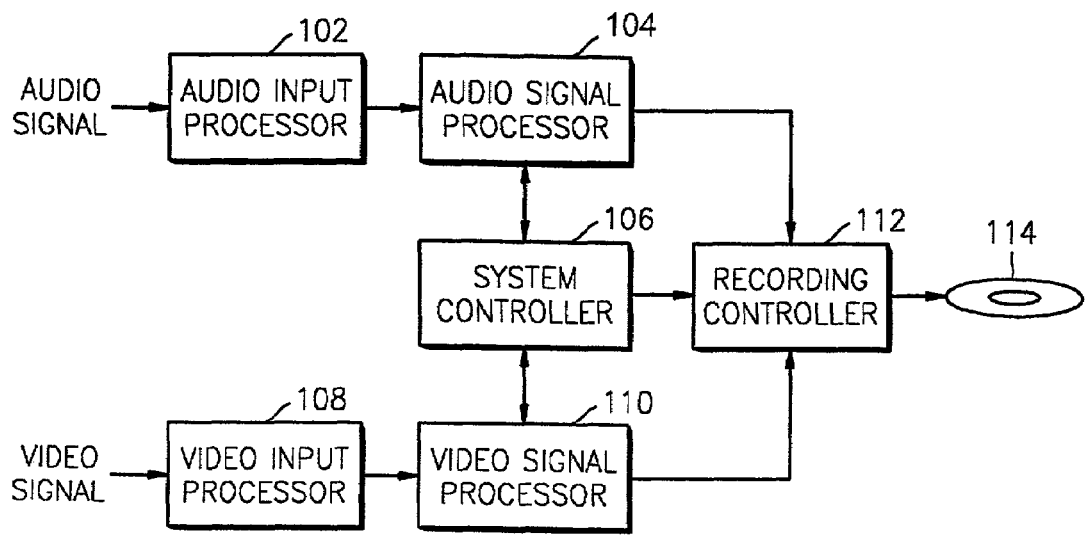
FIG. 6 is a block diagram showing an embodiment of an A/V recording apparatus according to the present invention.

FIG. 6 is a block diagram showing an embodiment of an A/V recording apparatus according to the present invention. An audio input processor 102 pre-processes an input audio signal and then provides digital audio data to an audio signal processor 104. The audio signal processor 104 formats the digital audio data into audio data units of a predetermined size, and codes the formatted audio data units.

Referring also to FIG. 5, a system controller 106 generates each audio data unit descriptor from information on the corresponding audio data unit and then records the descriptors in an audio data unit descriptor table. For an A/V program using a recorded audio data unit, information on the corresponding audio data unit descriptor is recorded in the corresponding A/V program descriptor and the A/V program descriptor is recorded in an A/V program descriptor table. In order to reproduce audio data, which is indicated by the A/V program, together with a video data unit which is recorded by a video recorder (here, a video input processor 108 and a video signal processor 110), information on the corresponding video data unit, that is, information on the video data unit descriptor, is recorded in the corresponding A/V program. Also, predetermined information of the corresponding video data unit descriptor (for example, information on the time when the corresponding video data unit is recorded) is copied and recorded in the A/V program descriptor table.

A video input processor 108 pre-processes the video signal and provides digital video data to a video signal processor 110. A video signal processor 110 formats video data into video data units of a predetermined size and codes the formatted video data units. Referring also to FIG. 5, the system controller 106 generates each video data unit descriptor from information on the corresponding video data unit and then records the descriptors in a video data unit descriptor table. For a video program using a recorded video data unit, information on the corresponding video data unit descriptor is recorded in the corresponding video program descriptor, and the video program descriptor is recorded in a video program descriptor table.

For construction of the data structure shown in FIG. 4, a recording controller 112 records an audio data stream formed by coded audio data units provided by the audio data signal processor 104, and a video data stream formed by coded video data units provided by the video signal processor 110, in a predetermined location of a recording medium 114. The recording controller 112 also records a video data unit descriptor table, a video program descriptor table, an audio data unit descriptor table, and an A/V program descriptor table provided by the system controller 106, in a predetermined location of the recording medium 114.

Figure 7:
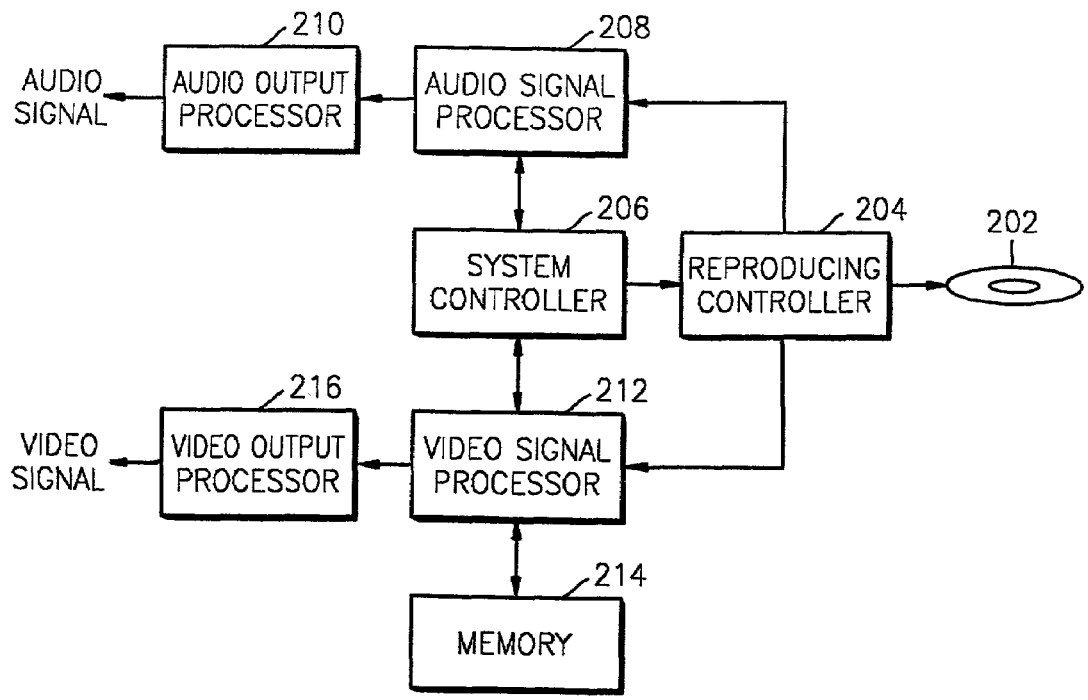
FIG. 7 is a block diagram showing an embodiment of an A/V reproducing apparatus according to the present invention.

FIG. 7 is a block diagram showing an embodiment of an A/V reproducing apparatus according to the present invention. A reproducing controller 204 reads an audio data stream and a video data stream recorded in a recording medium 202 and provides the streams to an audio signal processor 208 and a video signal processor 212, respectively, and reads a video program descriptor table, a video data unit descriptor table, an A/V program descriptor table and an audio data unit descriptor table recorded in the recording medium 202 and then provides them to a system controller 206.

The system controller 206 reads the A/V program descriptor of an A/V program which a user designates through a user interface, from the A/V descriptor table, and reads information on an audio data unit descriptor and a video data unit descriptor recorded in the A/V program descriptor, and then reads audio data unit descriptors and video data unit descriptors indicated by the information, from the audio data descriptor table and the video data descriptor table, respectively.

An audio signal processor 208 decodes and de-formats audio data units indicated by the audio data unit descriptor read by the system controller 206 and provides restored audio data.

An audio output processor 210 processes the restored audio data so that it can be used in external output devices like a speaker.

A video signal processor 212 temporarily stores video data units indicated by the video data unit descriptor read by the system controller 206, reads video data units related to audio data output from the audio signal processor 208 from a memory 214, and decodes and de-formats the read video data units to provide restored video data. Here, the memory 214 can be embedded in the video signal processor 212. A video output processor 216 processes the restored video data so that it can be used in external output devices like a monitor.

Here, before or during reproduction, predetermined information of a video data descriptor recorded in an A/V program descriptor table is compared to information of a video data descriptor linked to an actual video data descriptor table. When the two items of information are the same, reproduction is carried out; otherwise reproduction of the corresponding video unit is withheld.

Also, before reproducing in an A/V reproducing apparatus, a recording medium is recognized and at the same time predetermined information on video data unit descriptors linked to respective programs recorded in the A/V program descriptor table is compared to predetermined information on video data unit descriptors recorded in the video data descriptor table. When different parts are found in the comparison, the predetermined information on video data unit descriptors of the A/V program descriptor table is modified, that is, an operation for changing information on video data unit descriptors of the A/V program linked to the video data unit descriptors which were found to be different is carried out by the A/V recording apparatus shown in FIG. 6 or by the A/V recording/reproducing apparatus shown in FIG. 8.

The present invention can be applied to an audio-dedicated reproducing apparatus which has no devices required for video reproduction (a video signal processor 212, a memory 214, and a video output processor 216), and which uses a known recording/reproducing data structure.

That is, the system controller of an audio-dedicated reproducing apparatus reads the A/V program descriptor of an A/V program a user wants to be reproduced, from an A/V program descriptor table, reads information on an audio data unit descriptor recorded in the A/V program descriptor, and then reads the audio data unit descriptor indicated by the corresponding information, from an audio data descriptor table. An audio signal processor reads the audio data unit indicated by the read audio data descriptor and decodes and outputs the audio data.

Figure 8:
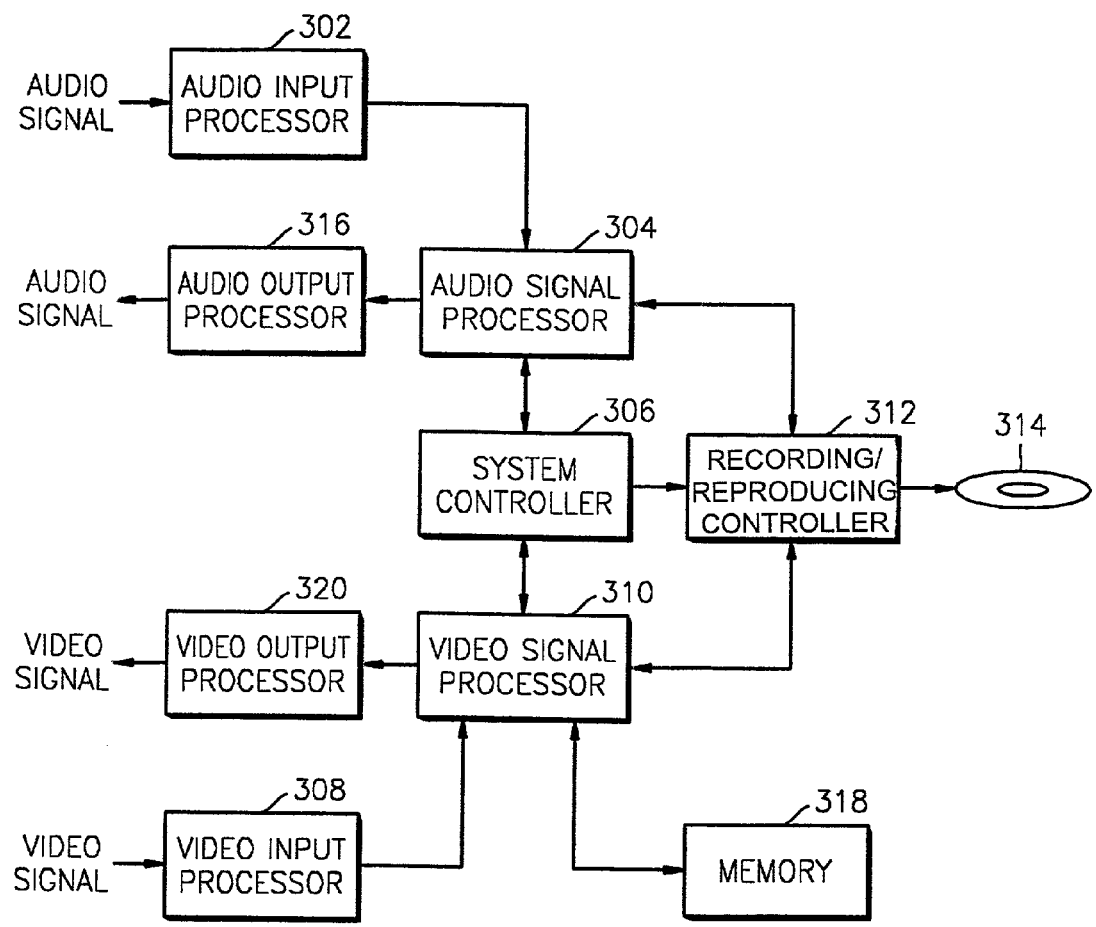
FIG. 8 is a block diagram showing an embodiment of an A/V recording/reproducing apparatus according to the present invention.

FIG. 8 is a block diagram of an embodiment of an A/V recording/reproducing apparatus according to the present invention. The A/V recording/reproducing apparatus shown in FIG. 8, performs similar functions as the A/V recording apparatus shown in FIG. 6 and the A/V reproducing apparatus shown in FIG. 7. An audio signal processor 304 is adapted to perform both the recording process of audio signal processor 104 and the reproduction process of audio signal processor 208. A video signal processor 310 is adapted to perform both the recording process of video signal processor 110 and the reproduction process of video signal processor 212. A system controller 306 is adapted to control both the audio signal processor 304 and the video signal processor 310 in a similar manner as system controller 106 controls audio signal processor 104 and video signal processor 110 and system controller 206 controls audio signal processor 208 and video signal processor 212. A recording/reproducing controller 312 is adapted to perform the same functions as recording controller 112 and reproducing controller 204, respectively. An audio input processor 302, a video input processor 308, an audio output processor 316, a memory 318, and a video output processor 320 are the same as the audio input processor 102, the video input processor 108, the audio output processor 210, the memory 214, and the video output processor 216 shown in FIGS. 6 and 7, and therefore an explanation on the structures and operations of audio input processor 302, video input processor 308, audio output processor 316, memory 318, and video output processor 320 will be omitted.

During recording, the audio signal processor 304 formats audio data into audio data units of a predetermined size, and codes the formatted audio data units, and during reproduction, the audio signal processor 304 decodes and de-formats an audio data unit indicated by an audio data unit descriptors read by the system controller 306, to provide restored audio data.

During recording, the video signal processor 310 formats digital video data into video data units of a predetermined size, and codes the formatted video data units and during reproducing, the video signal processor 310 temporarily stores video data units indicated by a video data unit descriptor read by the system controller 306, to the memory 318, reads a video data unit related to the audio data output from the audio signal processor 304, from the memory 318, and decodes and de-formats the read video data unit to provide restored video data.

During recording the system controller 306 generates a video data descriptor table, a video program table, an audio data descriptor table and an A/V program table as explained in FIG. 6, and during reproduction, the system controller 306 analyzes the video descriptor table, the video program table, the audio data descriptor table, and the A/V program table, as explained in FIG. 7, and provides controls so that audio data units and video data units a user wants can be reproduced.

During recording, the recording/reproducing controller 312 provides controls so that audio data streams formed by coded audio data units provided by the audio signal processor 304 and video data streams formed by coded video data units provided by the video signal processor 310, can be recorded in predetermined locations of the recording medium 314, and a video data unit descriptor table, a video program descriptor table, an audio data unit descriptor table, and an A/V program descriptor table provided by the system controller 306, in predetermined locations of the recording medium 314. During reproduction, the recording/reproducing controller 312 reads audio data streams and video data streams recorded in the recording medium 314, and provides the streams to the audio signal processor 304 and the video signal processor 310, respectively, and reads the video program descriptor table, the video data unit descriptor table, the A/V program descriptor table, and the audio data unit descriptor table recorded in the recording medium 314, and provides them to the system controller 306.

The present invention enables audio data, which is recorded separately from video data having an independent structure which is used for a video recording/reproducing apparatus, to be linked to the video data and to reproduce the audio and video data. Also, using predetermined data of a video data unit descriptor recorded in an audio program descriptor table, even after the video recording/reproducing apparatus carries out independent recording/reproducing operations, the result is automatically reflected in an A/V recording/reproducing apparatus so that normal reproduction can be performed.

In the case of a slide show, for example, a video recording/reproducing apparatus (for example, a video input processor 308, a video signal processor 310, a recording/reproducing controller 312, a memory 318, and video output processor 320 in FIG. 8) records still pictures in the form of video data units, and then corresponding video data unit descriptors store recording times of still pictures. An A/V recording/reproducing apparatus (an audio input processor 302, an audio signal processor 304, a recording/reproducing controller 312, and an audio output processor 316) input audio data, records the audio data in the form of audio data units, and information on the units are recorded in the corresponding audio data unit descriptors.

A user designates audio data units and video data units corresponding to still pictures that the user wants. The A/V recording/reproducing apparatus records information on the designated audio and video data units in the corresponding A/V program descriptors in the form of audio data unit descriptors and video data unit descriptors. The recording times of the video data unit descriptors are recorded in an A/V program descriptor table.

The A/V recording/reproducing apparatus reads the corresponding A/V program descriptors, reads audio data descriptors linked to the A/V program descriptors, and finds and reproduces the corresponding audio data. At the same time, the apparatus reads video data descriptors linked to the A/V program descriptors and reproduces the still pictures which correspond to the video data.

Before or during reproduction, it is determined whether the corresponding video data is the same as that wanted by the program, by comparing the recording time of the corresponding video data unit descriptor recorded in the A/V program descriptor table and the recording time in the actual video data unit descriptor. When these values are the same, reproduction is performed; otherwise reproduction is withheld, or the recording time of the video data unit descriptor in an A/V program descriptor table linked to the video data unit descriptor which was found to be different is modified.

Figure 9:
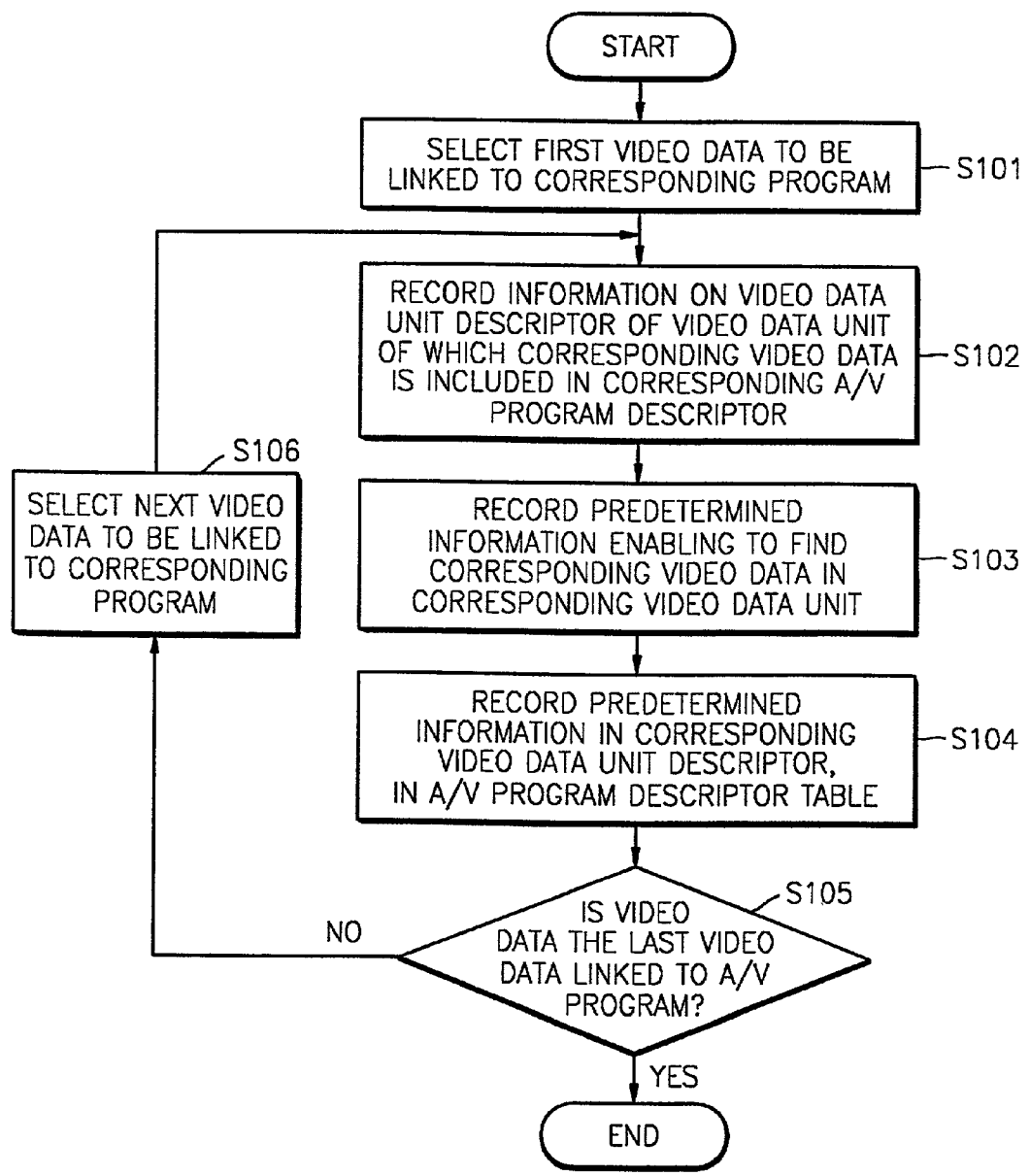
FIG. 9 is a flowchart showing a method of recording information linking audio data to video data according to the present invention.

FIG. 9 is a flowchart showing a method of recording information for linking audio data to video data according to the present invention. The first video data to be linked to a corresponding program is selected in operation S101. Information on the video data unit descriptor of a video data unit having the corresponding video data is recorded in the corresponding A/V program descriptor in operation S102. Predetermined information which can be used to find the corresponding video data in the corresponding video data unit (for example, information on the recording time of a video data unit) is recorded in operation S103. The predetermined information in the corresponding video data unit descriptor is recorded in the A/V program descriptor table in operation S104. It is determined whether or not video data linked to the A/V program is the last one, and if it is the last one, the process is finished in operation S105. Otherwise, the next video data to be linked to the corresponding program is selected in operation S106 and then operations S102 through S105 are repeated.

In the method shown in FIG. 9, audio data and video data are recorded on a recording medium in the form of audio data units and video data units, respectively. When information on the audio data and video data (a video data descriptor table, a video program descriptor table, an audio data descriptor table, and an A/V program descriptor table) is recorded on the recording medium, information for linking audio data and video data is generated and recorded in an A/V program descriptor table.

Figure 10:
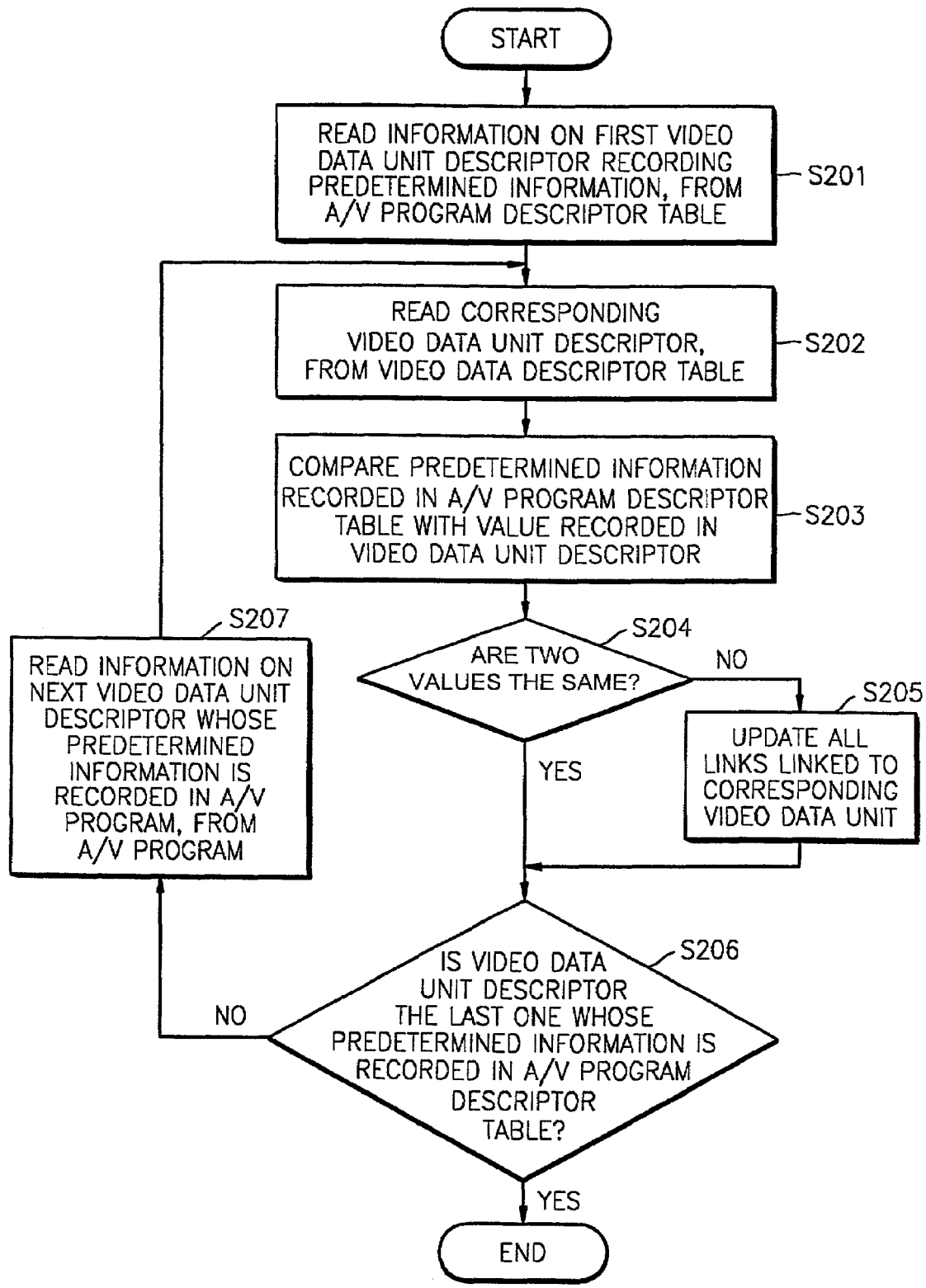
FIG. 10 is a flowchart showing a method of updating information linking audio data to video data according to the present invention.

FIG. 10 is a flowchart showing a method of updating information linking audio data to video data according to the present invention. Information on the first video data unit descriptor recording predetermined information is read from an A/V program descriptor table in operation S201. The corresponding video data unit descriptor is read from a video data descriptor table in operation S202. Predetermined information recorded in the A/V program descriptor table is compared to the value recorded in the video data unit descriptor in operation S203. It is determined whether or not the two values are same and when the values are not the same, the predetermined information is modified so that all links of the A/V program descriptor table linked to the corresponding video data unit descriptor can be updated in operation S205. When the values are the same, it is determined whether or not the video data unit descriptor is the last one of which predetermined information is recorded in the A/V program descriptor table in operation S206. If it is the last one, the process is finished; otherwise, the next video data unit descriptor having predetermined information is read in the A/V program descriptor table in operation S207, and the operations S202 through S206 are repeated.

The method of updating information linking audio data to video data shown in FIG. 10 can be performed before or during reproduction.

Figure 11A:
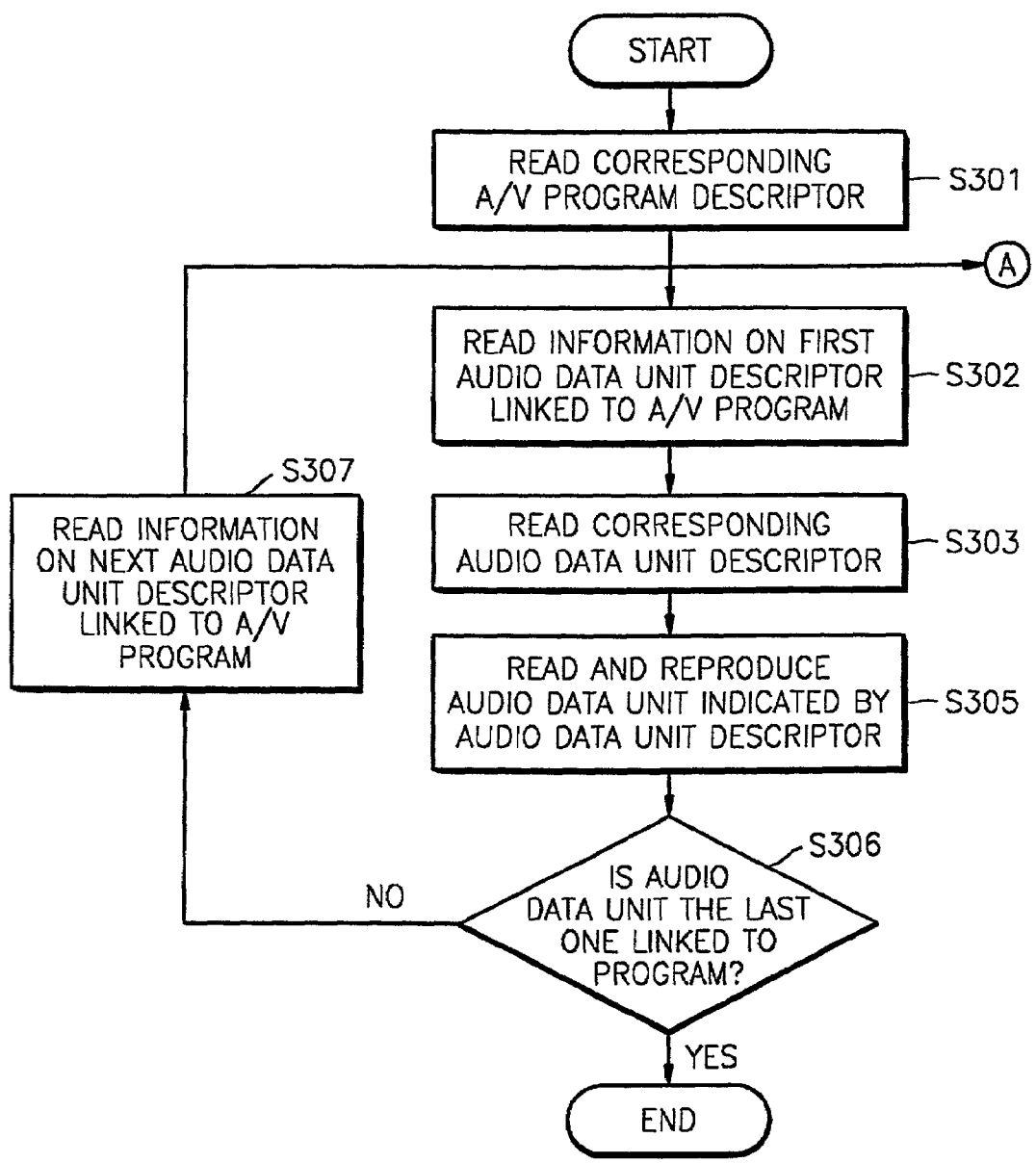
FIG. 11A and FIG. 11B are a flowchart showing a method of linking and then reproducing audio data and video data according to the present invention.
Figure 11B:
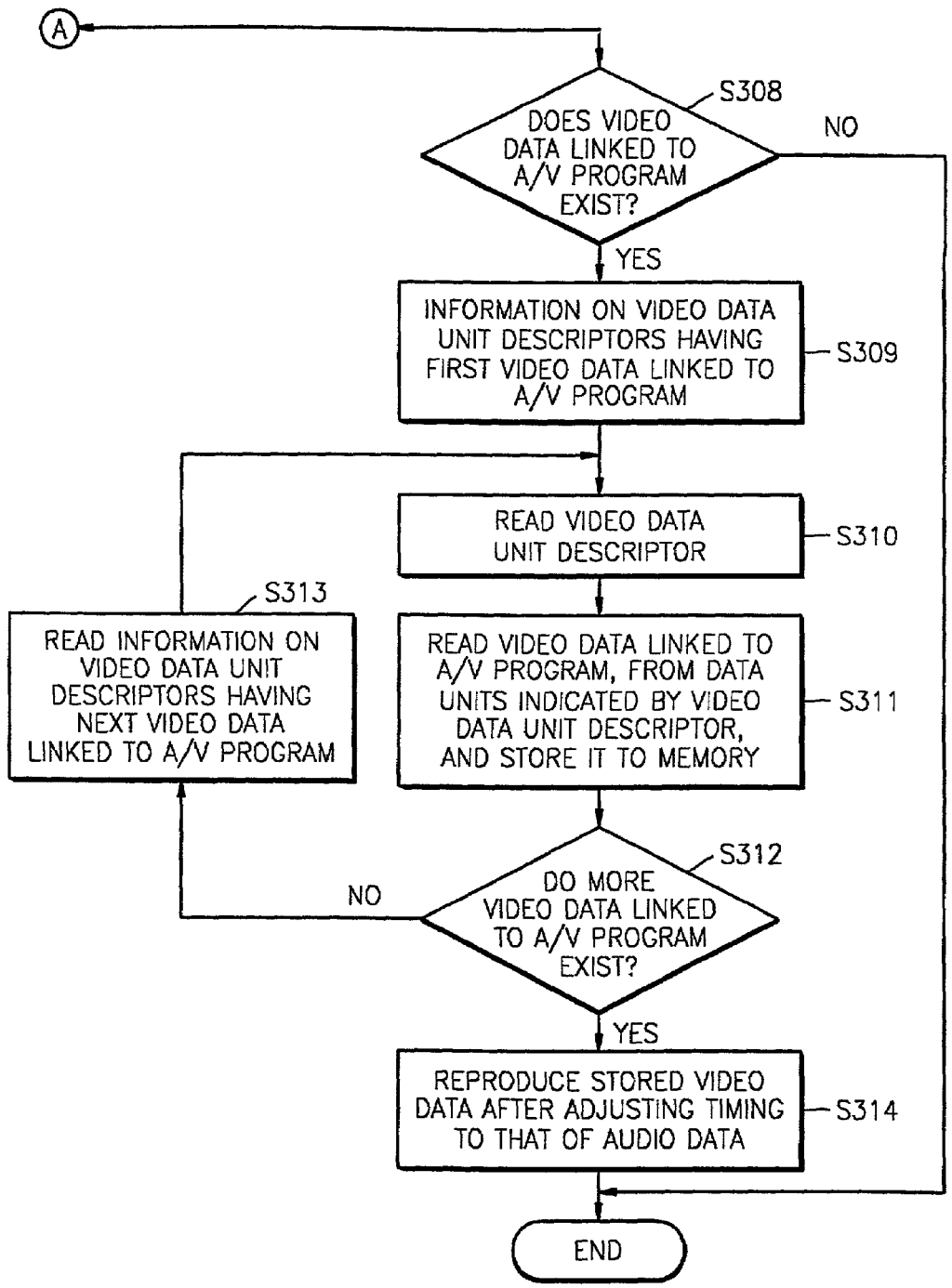

FIGS. 11A and 11B are a flowchart showing an embodiment of a method of linking and then reproducing audio and video data according to the present invention. FIGS. 11A and 11B are connected along the line indicated by "A" in both the Figures. The corresponding A/V program descriptor is read from an A/V program descriptor table in operation S301. Information on the first audio data unit descriptor linked to the A/V program is read from the A/V program descriptor in operation S302. The corresponding audio data unit descriptor is read from an audio data descriptor table in operation S303. The audio data unit indicated by the audio data unit descriptor is read and reproduced in operation S305. It is determined whether or not the audio data unit is the last one linked to the program in operation S306. If it is the last one, the process is finished; otherwise information on the next audio data unit descriptor linked to the A/V program is read from the A/V program descriptor in operation S307, and then the operations S302 through S306 are repeated.

Meanwhile, it is determined whether or not video data linked to the A/V program exists when the operations S302 through S307 are performed, in operation S308. If no video data linked to the A/V program exists at operation 308, the method ends. When such video data exists, information on video data unit descriptors having the first video data linked to the A/V program is read from the A/V program descriptor in operation S309. Video data unit descriptors are read from the video data descriptor table in operation S3 10. Video data linked to the A/V program is read from the data units indicated by the video data unit descriptor and stored in a memory in operation S3 11. It is determined whether or not video data linked to the A/V program still exists in operation S312. If such video data still exists, information on the video data unit descriptors having the next video data linked to the A/V program are read from the A/V program descriptor in operation S313, and then operations S310 through S312 are repeated. If video data linked to the A/V program does not exist in the operation S312, stored video data is reproduced after adjusting its timing to that of audio data in operation S314, and then the process is finished.

As described above, the present invention enables the generation of a new application linking two independent data structures, using the independent data structures for respective independent applications. By doing so, two different types of data that cannot be multiplexed to each other can be related to each other so that recording, editing and reproduction are enabled. Also, the present invention enables the reproduction of a song recorded in the form of audio data together with still picture data, video data, recorded separately from the audio data.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium on which is recorded a data structure comprising:

first data and second data which are different from each other in type and formed of a respective plurality of data units;

a first data unit descriptor table and a second data unit descriptor table in which information on the first data units and the second data units is respectively recorded as data unit descriptors; and a first program descriptor table and a second program descriptor table in which information on one or more data units forming respective programs is stored in a program descriptor of a corresponding program in the form of information on respective data unit descriptors, wherein;

the first and second program descriptor tables are recorded independently of the first and second data unit descriptor tables and the first and second data units, and the information on the first data units, which are to be reproduced after the first data units are linked to the second data units, is included in the program descriptor of the second program descriptor table.

2. The recording medium of claim 1, wherein the first data is video data of still pictures and the second data is audio data.

3. The recording medium of claim 1, wherein predetermined information in the first data unit descriptor is copied, as the information on the first data unit, to the program descriptor of the second program descriptor table.

4. The recording medium of claim 3, wherein the predetermined information is information on a recording time of the first data unit.

5. The recording medium of claim 1, wherein where the information on the first data unit in the second program descriptor table is not the same as the corresponding information on the first data unit in the first data unit descriptor, the information on the first data unit in the second program descriptor table is updated so that the information is the same as the information on the first data unit in the first data unit descriptor.

6. A recording method comprising:
recording first data and second data, which are different from each other in type and each formed of a respective plurality of data units, on a recording medium; and
recording a first data unit descriptor table and a second data unit descriptor table on the recording medium, wherein information on the first data units and the second data units is stored as data unit descriptors in the first and second data unit descriptor tables, respectively;
recording a first program descriptor table and a second program descriptor table on the recording medium, wherein:
the first and second program descriptor tables are recorded independently of the first and second data unit descriptor tables and the first and second data units,
information on one or more data units forming respective programs is stored as a program descriptor of a corresponding program in the form of information on respective data unit descriptors, and
the information on at least one of the plurality of the first data units, which is to be reproduced after the at least one of the plurality of first data units is linked to at least one of the plurality of the second data units, is included in the program descriptor of the second program descriptor table.

7. The recording method of claim 6, wherein the first data is video data of still pictures and the second data is audio data.

8. The recording method of claim 6, wherein predetermined information of the at least one first data unit descriptor is copied to and recorded in the program descriptor of the second program descriptor table, as the information on the first data unit.

9. The recording method of claim 8, wherein the predetermined information is the information on a recording time of the first data unit.

10. The recording method of claim 6, furthering comprising:
determining whether information on the first data unit in the second program descriptor table is the same as the information on the first data unit in the first data unit descriptor; and
when the two items of information are not the same, updating the information on the first data unit in the second program descriptor table so as to become the same as the information on the first data unit in the first data unit descriptor, and recording the updated information.

11. A reproducing method of reproducing data from a recording medium on which first data and second data which are different from each other in type and formed of a plurality of data units are recorded; a first data unit descriptor table and a second data unit descriptor table, in which information on the first data units and the second data units are respectively stored as data unit descriptors, are recorded; and a first program descriptor table and a second program descriptor table in which information on one or more data units forming respective programs are stored in the program descriptor of the corresponding program in the form of information on respective data unit descriptors, wherein in the program descriptor of the second program table information for linking the first data and the second data are recorded, the reproducing method comprising:
reading the second program descriptor having the information on the program to be reproduced, and then reading the information on the first data unit descriptor and the second data unit descriptor related to the corresponding program, from the read second program descriptor, wherein the second program descriptor table is recorded independently of the first and second data unit descriptor tables and the first and second data units;
reading the corresponding data unit descriptors from the first and second data descriptor tables corresponding to the read first and second data unit descriptors; and
synchronizing and reproducing the first data unit and the second data unit indicated by the read first and second data unit descriptors.

12. The reproducing method of claim 11, wherein the synchronizing and reproducing further comprises:
temporarily storing the first data units indicated by the first data unit descriptors corresponding to the program to be reproduced, to a memory; and
reproducing the second data units indicated by the second data unit descriptors corresponding to the program to be reproduced, and at the same time synchronizing, to the second data, and reproducing the first data units after reading the first data units stored in the memory.

13. The reproducing method of claim 11, wherein the first data is video data of still pictures and the second data is audio data.

14. The reproducing method of claim 11, wherein the information on the first data unit, which is to be reproduced after the first data unit is linked to the second data unit, is stored, as linkage information, in the program descriptor of the second program descriptor table, and predetermined information in the first data unit descriptor is copied, as the information on the first data unit, to the program descriptor of the second program descriptor table.

15. The reproducing method of claim 14, wherein the predetermined information is information on a recording time of the first data unit.

16. The reproducing method of claim 14, further comprising:
determining whether the information on the first data unit in the second program descriptor table is the same as information on the first data unit in the first data unit descriptor; and
when the two items of information are not the same, updating the information on the first data unit in the second program descriptor table so as to become the same as the information on the first data unit in the first data unit descriptor, and recording the updated information.

17. The reproducing method of claim 14, further comprising:
determining whether the information on the first data unit in the second program descriptor table is the same as the information, which corresponds to the information on the first data unit, on the first data unit in the first data unit descriptor; and
when the two items of information are not the same, reproducing the second data unit while withholding reproduction of the first data unit.

18. A recording apparatus for recording data of different types on a recording medium, the recording apparatus comprising:
a first signal processor which formats a first data stream input into independent units, codes the formatted first data units, and provides the coded first data units to the recording medium;
a second signal processor which formats a second data stream input into independent units, codes the formatted second data units, and provides the coded second data units to the recording medium; and a system controller which generates a first data unit descriptor table and a second data unit descriptor table, in which information on the first data units and the second data units are respectively stored as data unit descriptors, and a first program descriptor table and a second program descriptor table, in which information on one or more data units forming respective programs are stored in a program descriptor of a corresponding program in the form of information on respective data unit descriptors, wherein:

information on the first data unit, which is to be reproduced after being linked to the second data unit, is included in the program descriptor of the second program descriptor table, and the second program descriptor table is stored independently of the first and second data unit descriptor tables and the first and second data units.

19. The recording apparatus of claim 18, wherein the first data is video data of at least one still picture and the second data is audio data.

20. The recording apparatus of claim 18, wherein predetermined information of the first data unit descriptor, as information on the first data unit, is copied to the program descriptor of the second program descriptor table.

21. The recording apparatus of claim 20, wherein the predetermined information is information on a recording time of the first data unit.

22. The recording apparatus of claim 18, wherein the system controller determines whether information on the first data unit in the second program descriptor table is the same as the corresponding information on the first data unit in the first data unit descriptor, and, where the information is not the same, information on the first data unit in the second program descriptor table is updated so that the information in the second program descriptor table is the same as the information on the first data unit in the first data unit descriptor.

23. An apparatus for reproducing data from a recording medium on which first data and second data, which are different from each other in type and formed of a plurality of data units, are recorded; a first data unit descriptor table and a second data unit descriptor table, which include data unit descriptors having information on respective data units, are recorded; and a first program descriptor table and a second program descriptor table in which information on one or more data units forming respective programs are stored in the program descriptor of the corresponding program in the form of information on respective data unit descriptors, are recorded, wherein information for linking the first data and the second data is recorded in the program descriptor of the second program table, the reproducing apparatus comprising:

a system controller which reads the second program descriptor having the information on the program to be reproduced, reads the information on the first data unit descriptor and the second data unit descriptor related to the corresponding program from the read second program descriptor, and reads corresponding data unit descriptors from the first data descriptor table and the second data descriptor table corresponding respectively to read information on the first data unit descriptor and the second data unit descriptor, wherein the second program descriptor table is recorded independently of the first and second data unit descriptor tables and the first and second data units;

a memory;

a first signal processor, which temporarily stores the corresponding first data unit indicated by the read first data unit descriptor to the memory, decodes the first data unit stored in the memory, and reproduces the decoded first data unit after adjusting a timing of the decoded first data unit to that of the second data unit; and a second signal processor which decodes the corresponding second data unit indicated by the read second data unit descriptor and reproduces the decoded second data.

24. The reproducing apparatus of claim 23, wherein the first data is video data of still pictures, and the second data is audio data.

25. The reproducing apparatus of claim 23, wherein the information on the first data unit, which is to be reproduced after the first data unit is linked to the second data unit, is stored, as linkage information, in the program descriptor of the second descriptor table, and predetermined information in the first data unit descriptor is copied, as the information on the first data unit, to the program descriptor of the second descriptor table.

26. The reproducing apparatus of claim 25, wherein the predetermined information is information on a recording time of the first data unit.

27. The reproducing apparatus of claim 23, wherein the system controller determines whether the information on the first data unit in the second program descriptor table is the same as the corresponding information on the first data unit in the first data unit descriptor, and, where the items of information are not the same, the information on the first data unit in the second program descriptor table is updated so that the information is the same as the information on the first data unit in the first data unit descriptor.

28. The reproducing apparatus of claim 23, wherein the system controller determines whether the information on the first data unit in the second program descriptor table is the same as the corresponding information on the first data unit in the first data unit descriptor, and, where the items of information are not the same, the second data unit is reproduced while the reproduction of the first data unit is withheld.

29. The reproducing apparatus of claim 23, wherein the memory is embedded in the first signal processor.

30. An audio-reproduction-dedicated apparatus for reproducing data from a recording medium on which first data and second data which are different from each other in type and formed of a plurality of data units are recorded; a first data unit descriptor table and a second data unit descriptor table, which include data unit descriptors having information on respective data units, are recorded; and a first program descriptor table and a second program descriptor table in which information on one or more data units forming respective programs are stored in the program descriptor of the corresponding program in the form of information on respective data unit descriptors, are recorded, wherein information for linking the first data and the second data is recorded in the program descriptor of the second program table, the audio-reproduction-dedicated apparatus comprising:

a system controller which reads the second program descriptor having the information on the program to be reproduced, reads the information on the second data unit descriptor related to the corresponding program from the read second program descriptor, and reads corresponding data unit descriptors from the second data descriptor table corresponding to read information on the second data unit descriptor, wherein the second program descriptor table is recorded independently of the first and second data unit descriptor tables and the first and second data units; and a signal processor which decodes the corresponding data unit indicated by the read second data unit descriptor and reproduces the second data.

31. A recording/reproducing apparatus comprising:

a memory;

a first signal processor which formats first data input into independent units and codes the formatted first data units during recording; and which, during reproduction, temporarily stores a corresponding data unit indicated by a read first data unit descriptor to the memory, decodes the first data unit read from the memory, and reproduces the decoded first data unit after adjusting the timing of the decoded first data unit to that of a corresponding second data unit;

a second signal processor which formats second data input into independent units, codes the formatted second data units during recording; and, during reproduction, decodes the corresponding second data unit indicated by a read second data unit descriptor and reproduces the decoded second data unit; and a system controller which:

during recording, generates a first data unit descriptor table and a second data unit descriptor table storing information on the first data units and the second data units as data unit descriptors, and generates a first program descriptor table and a second program descriptor table in which information on one or more data units forming respective programs is stored in the program descriptor of the corresponding program in the form of information on respective data unit descriptors, wherein:

the second program descriptor table is recorded independently of the first and second data unit descriptor tables and the first and second data units, and the information on the first data unit to be reproduced after being linked to the second data unit is included in the program descriptor of the second program descriptor table; and, which, during reproduction, reads the second program descriptor having information on the program to be reproduced, reads information on the first data unit descriptor and the second data unit descriptor related to the corresponding program from the read second program descriptor, and reads corresponding data unit descriptors from the first data descriptor table and the second data descriptor table corresponding respectively to read the information on the first data unit descriptor and the second data unit descriptor.

32. The recording/reproducing apparatus of claim 31, wherein the first data is video data of still pictures and the second data is audio data.

33. The recording/reproducing apparatus of claim 31, wherein the information on the first data unit which is to be reproduced after the first data unit is linked to the second data unit is stored, as linkage information, in the program descriptor of the second descriptor table, and predetermined information in the first data unit descriptor is copied, as information on the first data unit, to the program descriptor of the second descriptor table.

34. The recording/reproducing apparatus of claim 31, wherein the predetermined information is information on a recording time of the first data unit.

35. The recording/reproducing apparatus of claim 31, wherein the system controller determines whether the information on the first data unit in the second program descriptor table is the same as the corresponding information on the first data unit in the first data unit descriptor, and, where the items of information are not the same, the information on the first data unit in the second program descriptor table is updated so that the information is the same as the information on the first data unit in the first data unit descriptor.

36. The recording/reproducing apparatus of claim 31, wherein the system controller determines whether the information on the first data unit in the second program descriptor table is the same as the corresponding information on the first data unit in the first data unit descriptor, and, where the two items of information are not the same, the second data unit is reproduced while the reproduction of the first data unit is withheld.

37. The recording/reproducing apparatus of claim 31, wherein the memory is embedded in the first signal processor.

38. A recording method comprising:

recording first and second data types on a recording medium, each type formed of a respective plurality of data units;

recording a first data unit descriptor table and a second data unit descriptor table, each table relating at least one data unit of each of the first and second types with a respective data unit descriptor; and recording a program descriptor table which relates at least one data unit descriptor of the first type and at least one data unit descriptor of the second type, wherein the program descriptor table is recorded independently of the first and second data unit descriptor tables and the first and second data units.

39. A recording method comprising:

recording first and second data types on a recording medium, each type formed of a respective plurality of data units;

recording a first descriptor table which relates at least one data unit of the first type with a respective first data unit descriptor; and recording a second descriptor table which relates at least one data unit of the second type with a respective data unit descriptor and with the respective first data unit descriptor of the at least one data unit, wherein the program descriptor table is recorded independently of the first and second data unit descriptor tables and the first and second data units.

* * * * *